Feb. 13, 1968  L. MANCIOLI  3,368,476
APPARATUS FOR MAKING A BEVERAGE, FOR EXAMPLE COFFEE
Filed June 21, 1966
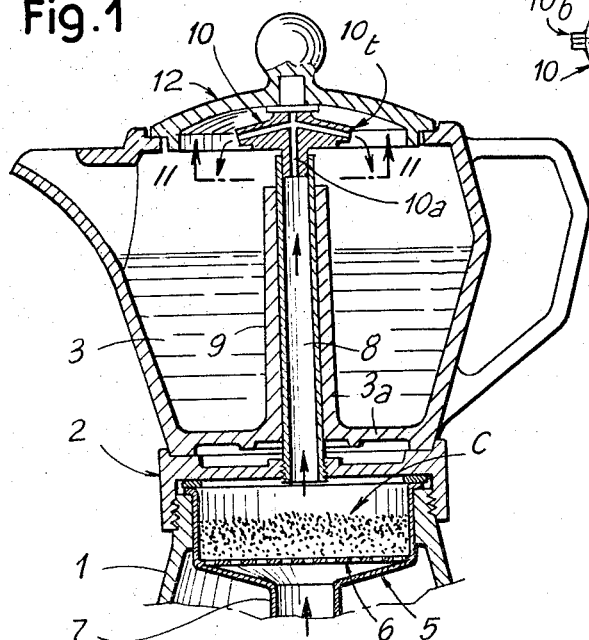
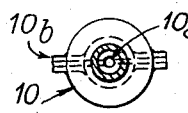
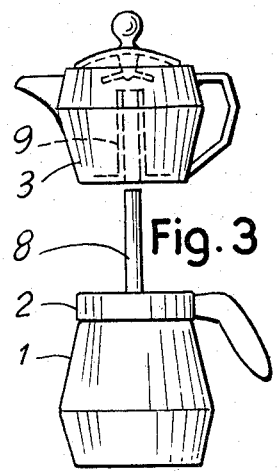
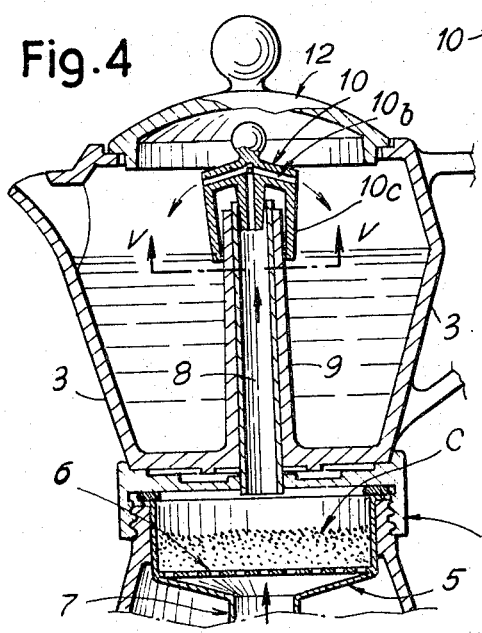
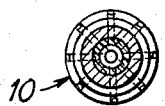
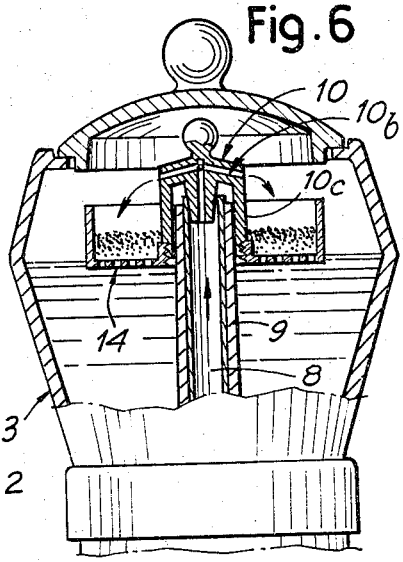
INVENTOR
LUCIANO MANCIOLI

United States Patent Office 3,368,476
Patented Feb. 13, 1968

3,368,476
APPARATUS FOR MAKING A BEVERAGE,
FOR EXAMPLE COFFEE
Luciano Mancioli, Via della Pesa 192, Montelupo
Fiorentino, Florence, Italy
Filed June 21, 1966, Ser. No. 559,301
Claims priority, application Italy, Sept. 2, 1965,
19,736/65
10 Claims. (Cl. 99—293)

ABSTRACT OF THE DISCLOSURE

A beverage infusion apparatus comprised of a lower container, a lid mounted on the lower container and an upper container arranged to be removably supported on the lid of the lower container. In making a beverage, such as coffee, water is heated in the lower container and flows into the upper container passing through a body of coffee which provides the beverage infusion action. The passageway from the lower to the upper container is provided by a first conduit extending upwardly from the lid on the lower container to the upper end of the upper container and a second conduit secured to the upper container and disposed about the first conduit in sliding relationship. A hood member is fitted within and in sealing engagement with the upper end of the first conduit, the hood member contains a passageway communicating between the interior of the first conduit and the interior of the second container. The upper container is removable from the lower container by sliding it upwardly along the first conduit, the hook member remaining in the upper second container, preferably positioned on the upper end of the second conduit preventing any backflow of beverage into the second conduit.

---

This invention relates to apparatus for making a beverage, for example coffee.

According to the present invention there is provided beverage infusion apparatus comprising, a first container adapted to carry a quantity of water to be heated and having an opening therein, means defining a passage for heated water leading upwardly from said first container, means in said passage for supporting material to be infused, lid means, for the opening of said first container, tube means defining a further passage extending upwardly from said lid means to an upper end, a second container adapted to rest on said lid means, means adapted to engage the outer surface of said tube means, said engaging means being rigid with and extending internally and upwardly within said second container, and hood means having a passage therein and arranged to engage in the upper end of said tube means whereby communication is established between the tube means and the passage in the hood means, said hood means being arranged to deliver hot water infused with said material into said second container through said passage therein.

Two embodiments of a coffee percolator in accordance with the invention will now be described, by way of example, with reference to the accompanying diagrammatic drawing, in which:

FIGURE 1 is a fragmentary axial section of a first embodiment;

FIGURE 2 is an inverted plan of the hood member viewed in the direction indicated by the line II—II of FIGURE 1;

FIGURE 3 is an external view, to a reduced scale, of the first embodiment with parts thereof separated;

FIGURE 4 is a fragmentary vertical section of a second embodiment;

FIGURE 5 is an inverted plan viewed in the direction indicated by the line V—V of FIGURE 4; and FIGURE 6 illustrates a modification of the embodiment of FIGURE 4.

Referring now to the drawing, the percolator comprises a first container or boiler 1, a flanged disc structure 2 which can be threaded on to a mouth or outlet of the boiler and a second container 3 forming a collecting cup for the coffee infusion or other beverage which can be prepared with the percolator. In the screwthreaded arrangement between the boiler 1 and the disc or lid 2, a funnel 5 carrying a filter 6 for coffee C, can be engaged, said funnel 5 including a tube 7, extending substantially to the bottom of the boiler 1. The disc 2 carries a small bore tube 8 which extends upwardly from the lower surface of the disc 2, and is in communication with the funnel 5 and filter 6.

The jug-like container 3 can be mounted or removed without any complementary operation with respect to the disc 2, on which the container is merely laid. The container 3 has a tube 9 upstanding from the bottom 3a thereof and the tube 9 encloses the small bore tube 8 when the container 3 is laid on the disc 2 and slides off the tube 8 when the container 2 is removed. The small bore tube 8 can accommodate at its free end a frusto-conical plug-like extension 10a of a hood member 10, and prevents the discharge of the liquid from the tube 8. The hood member 10 has internal passages which can discharge laterally through nozzles 10b into the interior of the container 3 from the passage in the extension 10a, thus avoiding any build-up of pressure in the interior of the small tube 8. The infusion and/or hot water received from the boiler through the small bore tube 8 is thus discharged into the cavity of the container 3, when the container 3 is laid on the disc 2 and the extension 10a fits into the end of the small tube 8. After lifting and withdrawing the container 3 from the disc 2 and by withdrawal from the tube 8, the drink or beverage can be poured. On replacing the container 3 on the tube 8 and on the disc 2, the various members are reset as in the previous arrangement and are ready for the operation of the coffee percolator, having renewed the ground coffee C.

In the embodiment of FIGS. 1 to 3, the hood member 10 is carried by the cover or lid 12 of the container 3 and in this embodiment the cover remains slightly spaced from its seat when the assembly is in the configuration of FIG. 1, that is, with the extension 10a secured as a seal on the end of the tube 8, the hood member lying on the tube 8.

In the embodiment of FIGS. 4 and 5, the hood member 10 has a skirt 10c is slidable on the end of the tube 9 and is independent of the cover 12. When the cover 12 is placed on the container 3, the hood member 10 can slide to a limited degree on the tube 9 without being disengaged therefrom. By removing the cover 12 the hood member 10 can also be removed. By lifting the container 3 from the disc 2, that is by sliding the tube 9 along the small bore tube 8, the hood member together with the end of the tube 9 is taken up, and the hood member remains retained between the end of the tube 9 and the cover 12.

The hood member 10 may carry an annular cup member 14 (FIG. 6), perforated like a strainer, which can carry for example tea leaves, camomile or coffee which serves to form a drink or beverage by means of hot water delivered from the boiler 1. The cup 14 may be carried by the skirt 10c or, in the embodiment of FIG. 1, may be secured to the hood member body, either rigidly or detachably. The hot water which rises in the tube 7 and from the small bore tube 8 is delivered from the nozzles 10b into the cup 14 thereby infusing or otherwise making the beverage merely by passage or alternatively by remaining at least partly in the small cup below the level of the liquid which is discharged into the jug container 3.

I claim:

1. A beverage infusion apparatus comprising a first container adapted to hold a quantity of fluid to be heated and having an opening in the upper end thereof, a lid disposed on the upper end of said first container and forming a closure for the opening therein, a second container removably supported in disengaged relationship on said lid and having an opening in the lower end thereof, said second container arranged to receive heated fluid from said first container, a first conduit secured into said lid and in communication with said first container, said first conduit extending upwardly through the opening in the lower end of said second container to the upper portion of said second container, a second conduit secured to the lower end of said second container about the opening therein and extending upwardly about and in sliding relationship with said first conduit, a hood member having a first centrally disposed section removably fitted within and in sealing engagement with the upper end of said first conduit and a second section extending outwardly from the upper portion of said first section, said hood member having a passageway extending through said first and second sections therein and communicating between the upper end of said conduit and the interior of said second container, and a cup member adapted to contain a beverage material through which the heated fluid passes in its path of flow from said first container to the second container.

2. A beverage infusion apparatus, as set forth in claim 1, wherein said second conduit is arranged in closely fitting sliding relationship with said first conduit for the full extend of its height, and the upper end of said second conduit is located below the upper end of said first conduit.

3. A beverage infusion apparatus, as set forth in claim 1, wherein a removable cover member is disposed on the upper end of said second container, and said hood member is secured to said cover member.

4. A beverage infusion appartus, as set forth in claim 1, wherein the first section of said hood member has a frusto-coincally shaped outer surface fitted within the upper end of said first conduit in sealing relationship therewith.

5. A beverage infusion apparatus, as set forth in claim 4, wherein the second section of said hood member has a skirt depending downwardly about the upper end of said second conduit.

6. A beverage infusion apparatus, as set forth in claim 5, wherein said cup member is attached to the lower end of said skirt on said hood member and is arranged to receive fluid from the passageway through said hood member and to discharge the fluid into the second container after its passage through the beverage material within the cup member.

7. A beverage infusion apparatus, as set forth in claim 6, wherein the passageway through said hood member comprises a vertically arranged centrally disposed passage through the first section thereof and a plurality of outwardly directed passages extending from the upper end of the centrally disposed passage and discharging into the upper end of said second container.

8. A beverage infusion apparatus, as set forth in claim 1, wherein said cup member is disposed in the upper end of said first container below and in communication with the lower end of said first conduit.

9. A beverage infusion apparatus, as set forth in claim 1, wherein said lid member is threadedly secured to said first container.

10. A beverage infusion apparatus, as set forth in claim 1, wherein said second container is removably supported within a depression formed in the upper surface of said lid member.

References Cited

UNITED STATES PATENTS

| 1,469,139 | 9/1923 | Acquaviva | 99—314 |
| 3,077,156 | 2/1963 | Egi et al. | 99—303 |

FOREIGN PATENTS

| 1,273,525 | 9/1961 | France. | |

ROBERT W. JENKINS, *Primary Examiner.*